United States Patent [19]

Hashimoto

[11] 4,396,804

[45] Aug. 2, 1983

[54] TELEPHONE ANSWERING DEVICE WITH AUTOMATIC REWIND

[76] Inventor: Kazuo Hashimoto, 28-2 Komazawa 2-chome, Setagaya, Tokyo, Japan, 154

[21] Appl. No.: 126,911

[22] PCT Filed: Oct. 21, 1978

[86] PCT No.: PCT/JP78/00009

§ 371 Date: Jun. 11, 1979

§ 102(e) Date: Jun. 11, 1979

[87] PCT Pub. No.: WO79/00226

PCT Pub. Date: May 3, 1979

[30] Foreign Application Priority Data

Oct. 22, 1977 [JP] Japan .................................. 52-127068

[51] Int. Cl.³ ........................ H04M 1/64; G11B 31/00
[52] U.S. Cl. .................................................. 179/6.13
[58] Field of Search ................... 179/6 R, 6 AC, 6 C, 179/6 E, 6.03, 6.07, 6.11, 6.12, 6.13–6.16

[56] References Cited

U.S. PATENT DOCUMENTS

| | | |
|---|---|---|
| 3,310,629 | 3/1967 | Yamamoto et al. ..................... 179/6 |
| 3,606,345 | 9/1970 | Cranor ..................... 179/6 |
| 3,640,479 | 2/1972 | Hata ..................... 179/6 |
| 3,713,039 | 1/1973 | Hashimoto ..................... 179/6 |
| 3,715,504 | 2/1973 | Piott ..................... 179/6 |
| 3,728,487 | 4/1973 | Hata ..................... 179/6 |
| 3,916,106 | 10/1975 | Hashimoto ..................... 179/6 |
| 3,943,292 | 3/1976 | Takazawa ..................... 179/6 |
| 4,104,686 | 8/1978 | Hashimoto ..................... 179/6 |

FOREIGN PATENT DOCUMENTS

| | | | |
|---|---|---|---|
| 2734342 | 10/1978 | Fed. Rep. of Germany ......... | 179/6 |
| 44-6163 | 3/1969 | Japan ..................... | 179/6 |
| 46-19245 | 5/1971 | Japan ..................... | 179/6 |

*Primary Examiner*—Raymond F. Cardillo, Jr.

[57] ABSTRACT

An automatic telephone answering device with simultaneous drive for the outgoing message tape (T-1) and the incoming message tape T-2 has a disadvantage in that the calling party's voice cannot be recorded within a section of T-2 (T2-1, T2-3) which is driven simultaneously with the first half (T1-1, T1-3) of T-1. To prevent this disadvantage, T-2 is to be automatically rewound within the wasted section (T2-1 and T2-3). Then, it records the calling party's voice on the section (T3-1 and T3-2). The instant rewinding distance depends on the tape volume on the tape reel but the above rewinding section is not overrun to the previous recording section (T3-1 and T3-2). So, it must have minimum blanks l1, l2, . . . ln.

2 Claims, 17 Drawing Figures

TELEPHONE ANSWERING DEVICE WITH AUTOMATIC REWIND

FIELD OF ART

This invention pertains to the tape driving system and the device which are used in the automatic telephone answerer, and which minimize a wasted section of the incoming message tape which is unavoidable in the prior arts of the automatic telephone answerer, wherein it drives both the out-going message tape and the incoming message tape simultaneously upon receipt of a telephone call, and makes the incoming message tape the recording mode upon finishing of the first half of the out-going message tape and resets the device in the stand-by mode upon finishing of the latter half of the out-going message tape and this invention belongs to Main Classification HO4M 1/64 of IPC.

BACKGROUND ART

In the prior art of the automatic telephone answerer, to which the invention is directed, there have been two kinds of the tape. One is the out-going message tape (hereinafter called "T-1") and another is the incoming message tape (hereinafter called "T-2"). The above two tapes are driven sequentially or simultaneously and performs the operations of sending an announcement and of taking messages. For instance, in the Japanese Pat. No. 424,747 (Application Ser. No. 36-8531), T-1 is driven at first upon receipt of a telephone call, and then T-2 is driven after T-1 stops. In the simple model of the automatic telephone answerer, for instance, the Japanese Pat. No. 491,669 (Application Ser. No. 39-7915), T-1 and T-2 are driven simultaneously upon receipt of a telephone call and the operation time of T-2 is controlled by one cycle of T-1. In the latter patent, the out-going message is pre-recorded on the first half of T-1, for instance, for 20 seconds, and a beep-tone is generated by the conventional method. Then, it can take the incoming message on T-2. However, during the above 20 seconds, T-1 and T-2 are driven simultaneously. So, there should be a 20-second blank between the previous message and the next message every time the user plays back the T-2, but the above blank of tape is regarded as an unavoidable waste in the said driving system. Among many automatic telephone answerers, there is one kind of the device as the Japanese Pat. No. 532,850 (Application Ser. No. 42-79425), which records not only the incoming message but also the out-going message on T-2 in every operation. The above tape driving system is called "simultaneous driving method" in the United States of America. For instance, the automatic telephone answerer with the trade name "Tele-Tender" on the United States market adopts the above method, but in ordinary cases, it is intricate and troublesome for general users to hear the out-going message every time before listening to every incoming message which has been recorded on T-2. It can be understood that the above 20 seconds is anyway a waste of time for users, but the above disadvantage has been regarded as an inevitable demerit in these prior arts.

DISCLOSURE OF THIS INVENTION

This invention is to enable the automatic telephone answerer, which drives both the out-going message tape (hereinafter called "T-1") and the incoming message tape (hereinafter called "T-2") simultaneously upon receipt of a telephone call and controls the driving time of T-2 by one cycle of T-1, to automatically fast rewind T-2 alone within the length of the wasted section of T-2 which has been driven simultaneously with the first half of T-1 (hereinafter called "wasted section") immediately after the out-going message is finished and the beep-tone is generated, and then to record the incoming message at the ordinary tape driving speed.

For rewinding the above wasted section of T-2, this invention is to enable the control means to prevent erasing of the previously-recorded message caused by over-driving, irrespective of the diameter of the wound tape, namely, regardless whether the wasted section is located close to the beginning (having smaller diameter) or the end of T-2 (having larger diameter). This invention provides a driving method which makes it easy to keep the disengaged condition of the capstan and the pinch roller not only for T-1 but also for T-2 when the automatic telephone answerer is in stand-by mode.

BRIEF DESCRIPTION OF DRAWINGS

The details of this invention will be described in connection with the accompanying drawings, in which.

THE BEST MODE FOR CARRYING OUT THE INVENTION

To explain the details of the best mode for carrying out this invention, the Applicant explains some typical examples according to the attached drawings.

EXAMPLE 1

Figure 1:
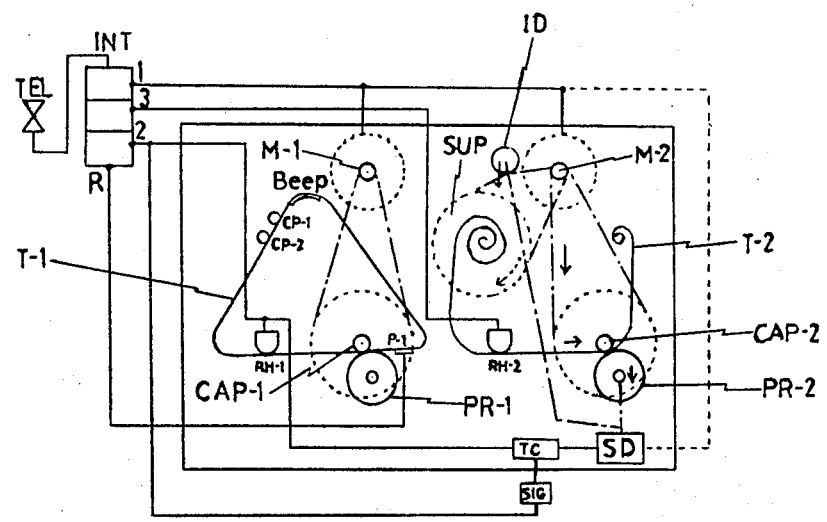
FIG. 1 is the diagram of the driving principle of the automatic telephone answerer which has independent T-1 and T-2 driving mechanisms.

In FIG. 1, T-1 is an endless type tape, T-2 is a cassette type tape and every tape owns independent driving mechanism. The automatic telephone answerer with the trade name "Tele-Tender" on the United States market is one of these types.

In FIG. 1, TEL shows telephone, INT denotes interface, 1, 2 and 3 thereof are output terminals as further described below, R denotes reset terminal, SD denotes plunger coil and TC shows time control. Marking "BEEP" is made on tape T-1. When this marking "BEEP" passes through playback head RH-1 at the end of out-going message, its output energizes the time control TC and then, the plunger coil SD is released. Since it is a well-known fact that, in regular automatic telephone answering and recording devices, this beep tone is produced at the end of the out-going message, and the incoming message tape is driven in recording mode upon generation of this beep tone, detailed explanation is omitted herein. Another one of the time control output terminals energizes a circuit SIG which generates a particular signal. It is so constructed as to transmit this particular signal to the telephone line through terminal 2 of the interface. When the endless outgoing message tape T-1 finishes its one cycle driving, a portion with an end mark or metal foil which is shown by P-1 shorts electrodes CP-1 and CP-2, etc. Then, every device is reset by reset terminal R of the interface circuit. Wires from the interface output terminal 1 are connected to motors M1 and M2. When a calling signal is received and the interface circuit is in an energized condition, the motors M1 and M2 are activated simultaneously, and then the out-going message tape T-1 and the incoming message tape T-2 are activated simultaneously. At the same time, the plunger coil SD is energized, and this plunger coil SD pushes pinch-roller PR-2. Then, the pinch-roller PR-2 is pressed to the capstan-2, and the incoming message tape T-2 is driven. This mechanism is constructed so that, when said pressing is released, rewind shall start. Explaining the structure of this mechanism, when the motor M2 makes the capstan rotate by means of a belt, if the belt runs in a direction as indicated with an arrow-marking, the plunger coil SD is pressed to the capstan, and the tape is driven forward, namely in the arrow-marked direction, at regular speed. However, if said activation of the plunger coil is released by the time control TC, the pinch-roller PR-2 returns in the arrow-marked direction, and idler-wheel ID comes downward by a linking means related thereto. Then, the belt which is provided between the motor M2 and the supply-reel is pulled in an arrow-marked direction. Accordingly, the belt, which has been loose until then, shall become tight, and the supply-reel is driven in a direction marked with a dotted arrow. Then, the tape T-2 is rewound. Since aforementioned functions are already well-known, detailed explanation is omitted herein.

Figure 3:
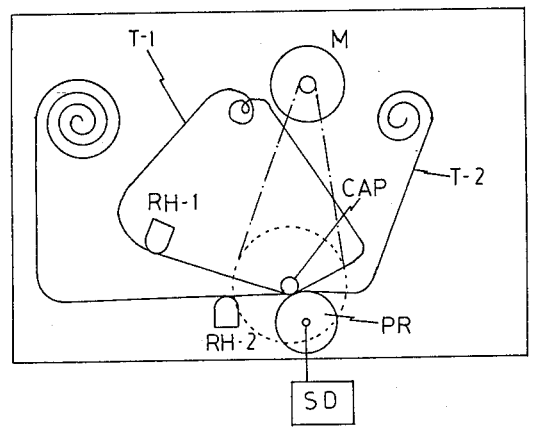
FIG. 3 is the tape driving principle diagram of the automatic telephone answerer which has independent T-1 and T-2 driven by a common mechanism only in the case of the ordinary tape driving speed.
Figure 5:
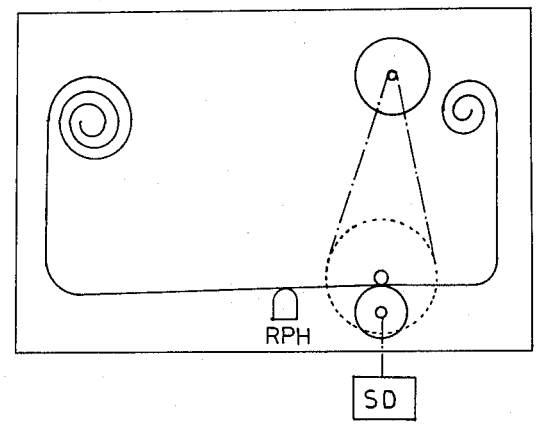
FIG. 5 is the tape driving principle diagram of the automatic telephone answerer which has T-1 and T-2 on the different tracks alternately on the same tape.
Figure 7:
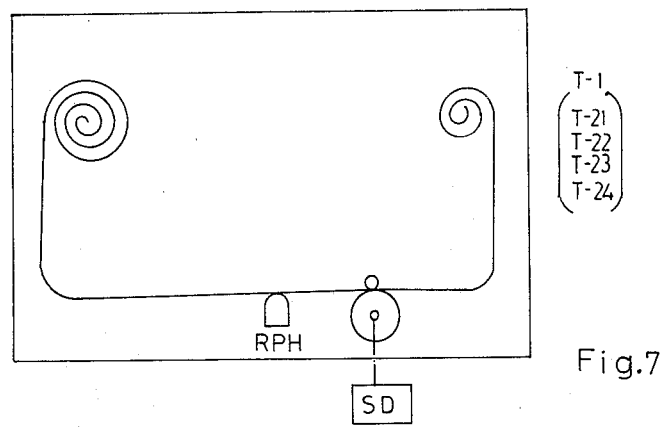
FIG. 7 is the driving principle diagram of the automatic telephone answerer which has one track of T-1 and multi-track of T-2 vertically, the length of which is equivalent to T-1 respectively.

Secondly, in FIG. 3, the same structure as that shown in FIG. 1 is adopted. In this case, it is designed that a single motor is provided for common uses as M1 and M2 of FIG. 1. When pressing of the pinch-roller is released by the plunger coil SD, only the incoming message tape T-2 is fast rewound by the same means as shown in FIG. 1. Therefore, the outgoing message tape T-1 is in free condition in this instance. In FIGS. 5 and 7, the out-going message tape T-1 and the incoming message tape T-2 consist of a single piece. Consequently, it is the same as aforementioned.

Figure 2:
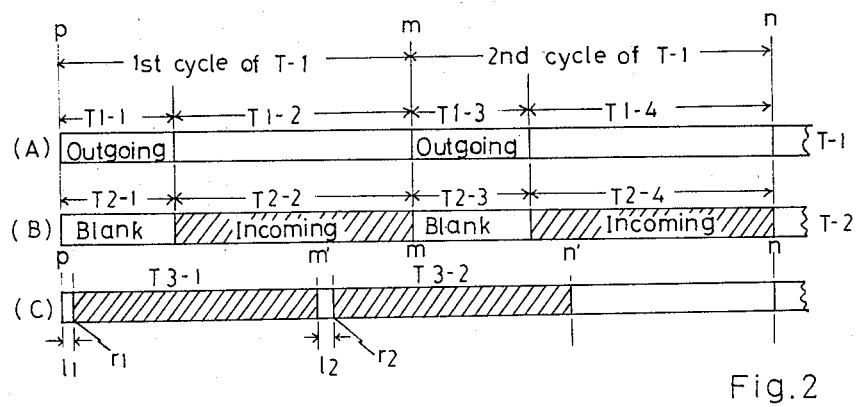
FIG. 2, including A-C, is the timing chart of the driving mechanism in FIG. 1.

In this device, the relation in a driving method between T-1 and T-2 is indicated in (A) and (B) of FIG. 2. In (A), one cycle of T-1 is composed of T1-1 and T1-2. In an ordinary case, the out-going message is recorded on T1-1, that is the first half of T-1. Upon receipt of a telephone call, T-1 and T-2 are driven simultaneously and a pre-recorded out-going message is played back from T1-1. After generating a beep-tone during 1 to 2 seconds, the inside amplifier circuit turns over to a recording mode of T-2. From this time, if a calling party speaks a message, his voice is recorded on T2-2 which is equal to the length of T1-2. In the ordinary case, T1-1 is about 17 to 18 seconds and T2-2 is about 45 seconds. Total time of one cycle is about 60 seconds. After the above one cycle, both T-1 and T-2 stop at point m and the automatic telephone answerer becomes stand-by mode. Upon receipt of the next telephone call, the automatic telephone answerer repeats the above function. At this time, T-1 is composed of T1-3 and T1-4 as above mentioned. The recording section of T-2 is indicated by T2-4 which is equivalent to the length of T1-4. At point n, both T-1 and T-2 stop simultaneously and the automatic telephone answerer becomes the stand-by mode. Comparing (A) and (B), there are a blank section T2-1 which is equivalent to T1-1 and another blank section T2-3 which is equivalent to T1-3. These blank sections on T-2 are generated at every operation. So, when the user of this automatic telephone answerer wants to play back T-2 after returning home, he feels these blank sections as waste of time because it spends 17 to 18 seconds at the ordinary tape driving speed. It is too long for the user to wait anyway.

The Applicant hereinafter explains T-2 driving mechanism which is used in this invention.

In FIG. 1, SD is a solenoid coil which pushes and pulls a sliding plate with a head and a pinch roller from/to the tape and the capstan. When the solenoid coil SD and the motor M-2 are energized, the tape driving mechanism is in the ordinary play-back condition, but if only the motor is energized and the solenoid coil is not energized, the above solenoid coil disengages the idler wheel (which is not shown in the drawing), and then the tape driving mechanism becomes rewinding condition. So, if the above mechanism is used, it is easy to rewind the above blank sections T2-1, T2-3 . . . on T-2 in each operation. Details of this mechanism have been open to public by the Japanese Patent Publication No. S52-29123 (Patent Application S46-8055). In this patent, it is described that if the solenoid coil SD is energized, it becomes the ordinary play-back condition, but if the above coil is disenergized and only the motor is energized, it becomes the rewinding condition. In such a mechanism, the motor M-2 and the solenoid coil SD are not energized in the stand-by condition. So, engaging of the pinch roller and the capstan cannot be made. In the inexpensive automatic telephone answerer, as shown in FIG. 1, the capstan and the pinch roller are usually engaged by force with some pressure in the stand-by mode. So, when the stand-by condition is kept for a long time, the capstan hurts the face of the pinch roller through the magnetic tape. Such condition causes wow and flutter during tape driving and it hurts voice quality. On the contrary, if the above mechanism of this invention is used, the above disadvantage can be solved because in the stand-by mode, the pinch roller and the capstan are disengaged. Also, it makes possible to utilize the automatic telephone answerer which controls the driving time of T-2 by one cycle time of T-1 as the remote-controlled automatic telephone answerer of a simple construction by adopting such a tape driving mechanism as that of this invention, because in the case of the remote-controlled automatic telephone answerer, it is essential for the user to rewind T-2 at first and then to play back T-2 by remote controlled operation to listen to the stored incoming message, and for those purposes, adoption of the tape driving mechanism like that of this invention would provide such an advantage as shooting two birds with one stone since the tape driving mechanism of this invention rewinds T-2 in any length as the user wants in remote play-back mode and also rewinds the above blank section produced on T-2 before recording the incoming message by simply energizing of one plunger coil.

The Applicant hereinafter explains the operation of this invention. Upon receipt of a telephone call, the out-going message on T1-1 is sent to the calling party, and a section of T2-1 of T-2 which is rewound and stops at the point r1 which is close to the beginning of T-2, and then, begins to run at the ordinary tape driving speed. During the above rewinding, the automatic telephone answerer generates a beep-tone which asks the calling party to leave a message, and that beep-tone stops at the point r1 of (C). Then, T-2 can record the incoming message from the point r1 to m', that is T3-1 as shown in (C) of FIG. 2. The above section T3-1 is a little less than T2-2 in (B) of FIG. 2. It is understandable that in FIG. 1, the function time of T-2 is controlled by one cycle time of T-1, even if the mechanism of each of T-1 and T-2 is independent of each other, and T-1 is running even during fast rewinding of T2-1. Consequently, the rest of the control time of T-1 becomes shorter by about 1 second which is necessary for rewinding T2-1. It is also understandable that during rewinding of T2-1 very fast, it should not be rewound up to the point p, that is the beginning point of T-1. Likewise, when a section T2-3 which corresponds to T1-3 is fast rewound at the second telephone call, it should not be rewound beyond the beginning point of the instant driving, namely the end point m of the previous cycle, because if it is rewound beyond the above point m, the last part of the previously-recorded incoming message of T2-2 will be erased in the recording mode. So, it can be understood that in the case of rewinding T2-1 and T2-3, the length to be rewound should be limited to the length which is less than the actual T2-1 and T2-3 respectively.

Generally speaking, in the ordinary automatic telephone answerer, usually, there is a little blank between every message, and that blank is useful for the user to play back T-2 step by step. From such a viewpoint, in this invention, the above blank sections 1 and 2 as shown in (C) of FIG. 2 are also useful for the user to play back the message. The above blank time can be surely secured by using a rough timer which is actuated by adjusting the time constant (C and R) which has less time than T1-1. The timer like that is not sophisticated but is of the conventional type for the electronic circuitry. So, it is not shown in the drawing. As the above explanation, the recording condition of T-2 leaves the blank sections l1, l2, . . . ln on T-2, as shown in (C) of FIG. 2. It is easy to understand that each of the said blanks l1, l2, . . . ln is much less than the blanks T2-1, T2-3, . . . T2-n respectively. So, it can have much more messages than (B) on the same length of T-2, for instance, C-60 type of the compact cassette and also in the case of playback, the user can hear the next message much faster than (B). It can be understood that there is difference in the diameter of the wound tape on the reel between the beginning situation and the position which is closer to the end of the tape. Also, it has tolerance on the time constant of C and R, and also there is a little difference in slipping or friction in the same mechanism. So, in the above consideration, the actual blank time of l1, l2, . . . should be decided. According to the practice, it is recommended that l1 is about 4 seconds, and then the blank time is gradually increased as the position of T-2 is shifted to l2, l3, . . . , and l30 is about 10 seconds nearly at the tape end. According to the above condition, this method seems to be not reliable, but it has such advantageous features as explained hereinafter. The Applicant explains those features as follows.

In the conventional remote-controlled automatic telephone answerer, the user who is located far from his machine cannot see the tape position, namely whether it is close to the beginning point or end position. So, when he wants to rewind this tape by remote control, he cannot know how long it should be rewound to reach a suitable position from where T-2 should be played back. This is a disadvantage of the conventional tape driving mechanism of the remote controlled automatic telephone answerer, but, in this invention, if the user performs remote control from the outside telephone to his machine, he can hear one blank section, for instance, la which may be one of the above l1, l2, . . . l30. So, by measuring the actual blank time, he can discriminate a rough position of T-2. Therefore, it helps the user remote-control T-2 in any way as he wants. In FIG. 1, some kinds of the automatic telephone answerer have the function which can record the out-going message of T1-1 on T2-1 of T-2. So, the above l1, l2, . . . ln have some recorded words out of the complete out-going message depending on the actual length of it. So, in these machines, the above la, lb, lc, . . . can be roughly discriminated by words recorded on T-2 from the out-going message which has been pre-recorded on T-1 by the user's voice. So, the user can easily know the rough position of T-2. In FIG. 1, RH-1 is a recording head of T-1, CAP-1 is a capstan, PR-1 is a pinch roller, M-1 is a motor, RH-2 is a recording head of T-2, CAP-2 is a capstan, PR-2 is a pinch roller, M-2 is a motor and SD is a solenoid coil. The same marks are denoted in other figures, too.

EXAMPLE 2

Figure 4:
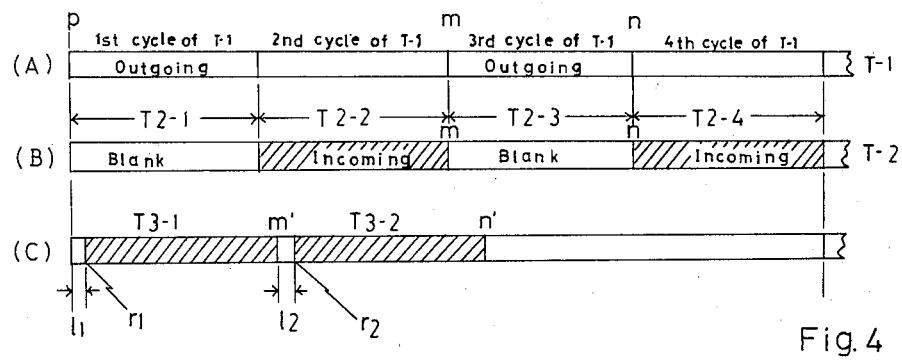
FIG. 4 is the timing chart of FIG. 3.

In FIG. 3, it is shown that the common driving system which drives T-1 and T-2 simultaneously by the capstan and the pinch roller. In this example, T-1 is the endless tape and T-2 is the ordinary cassette tape. Every tape has its own recording head RH-1 and RH-2 respectively. For instance, this example is already notified in the U.S. Pat. No. 4,104,686, "Tape cassette with reel to reel and endless tape". When they are driven at the ordinary tape driving speed, T-1 and T-2 are driven by a common capstan and pinch roller simultaneously, but in the case of rewinding and fast forwarding of T-2, it does not need to use the capstan. So, T-1 has no relation with rewinding of T-2 and fast forwarding of T-2 either. In FIG. 4, the timing chart (A) means the situation of T-1. In the ordinary case, the first cycle of T-1 is the announcing cycle, and the second cycle of T-1 decides the time of message-recording cycle in which it takes the incoming message on T-2. So, it is clearly understood that T2-1 of (B) is driven in waste without any function. After one cycle of T-1, the beep-tone is generated, then the amplifier of T-2 tape deck becomes the recording mode and records the incoming message on T2-2. At the point m, that is the end of the second cycle of T-1, both T-1 and T-2 stop and then, the automatic telephone answerer becomes the stand-by mode. The above operations are repeated by the next telephone call. It is understandable that T2-3 on T-2 which is equivalent to the position of the third cycle of T-1 is a wasted section as above said. To overcome the disadvantage of the above driving method and the device, this invention is useful when it can rewind T2-1 within the same limited length as that in FIG. 2 and then records the incoming message on T-2 (that is T2-2). Then, after the second cycle of T-1, both T-1 and T-2 stop. At the next telephone call, T-2 is automatically rewound within the length of T2-3 and then, records the incoming message on T2-4 and then stops after the fourth cycle of T-1. To indicate on the drawing the actual movement of T-2, it is shown on (C). In (C), l1 and l2 mean how they shorten the blank sections of T2-1 and T2-3 because T2-2 of (B) was moved to T3-1, and T2-4 of (B) was moved to T3-2. In this example, one cycle of T-1 is for the out-going message cycle and the second cycle of T-1 is for the message-receiving cycle, but according to this example, it is possible to use a half of T-1 for the out-going message cycle and another half of T-1 for the message-receiving cycle. Usually, the first half and the second half is not the same length, depending on the user's option, but the principle is the same as abovementioned.

EXAMPLE 3

Figure 6:
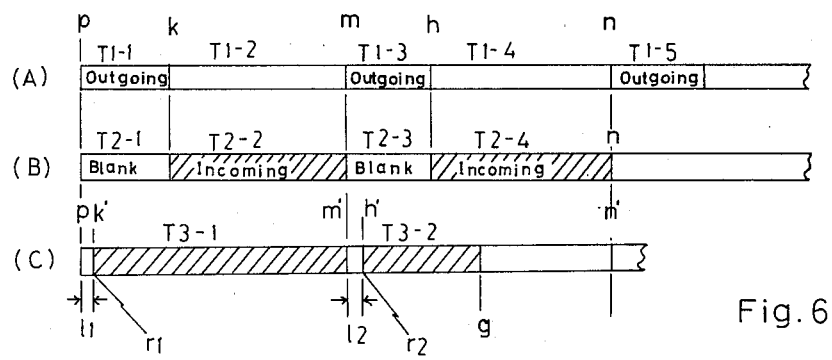
FIG. 6, including A-C, is the timing chart of FIG. 5.

In FIG. 5, a single cassette tape is shown. In this system, it has the same out-going message pre-recorded by the user or the factory with a certain interval like T1-1, T1-3, T1-5, etc. on the track on the upper half of a single tape as shown in FIG. 6 (A). Between T1-1 and T1-3, there are T2-2 and T2-4 of another track on which the incoming message is recorded. In some of these kinds of the automatic telephone answerer, the incoming messages are recorded respectively on T1-2 and T1-4 of the same track of T-1. It has also the same principle as the above mentioned example. Anyway, one cycle of T-1 consists of T1-1 and T2-2. Upon receipt of a new telephone call, the out-going message is sent through T1-1, and then, when it reaches the signal point k, T-2 becomes the recording mode as above mentioned. The section of T2-2 is the recording section of the incoming message. Therefore, it should be understandable that T2-1 and T2-3 on T-2 are the blank and wasted sections without any function. When the user returns home, he should bear the above mentioned blank section if he wants to play back only T-2. This invention is useful as follows. When a telephone call comes, it sends the pre-recorded out-going message from T1-1. T-2 is automatically rewound from the point k to the point k' of (C), and after the point k', another track of the tape becomes the recording mode and is driven at the ordinary tape driving speed, but the driving time is limited by the point m, because T-1 and T-2 are combined on the same material. So, it is understandable that the recording time of T-2 is longer than T2-2, which is the length of k'-m'. If the calling party does not record his message on the whole length of the above section, the operation will end on its way. However, driving of the tape is continued and then, it stops at the point m' and the automatic telephone answerer is reset in the stand-by mode. At the next telephone call, the above operation will be repeated. In the ordinary case, T1-3 produces the outgoing message and from the point h, T2-4 becomes the recording section, but in this invention which has the above mentioned driving method and systems, T-2 is fast rewound from the point h to the point h', and then from the point h', it becomes the recording mode which can take the incoming message of the calling party. If the calling party hangs up at the point g, the tape is still driven from the point g to the point n', and records the busy-tone or the dial-tone, depending on the telephone exchange system. After the point n' which is equivalent to the point n of (A) and (B), the tape is forced to stop, and then the automatic telephone answerer becomes the stand-by mode. After the user returns home, he waits only every l1, l2, . . . ln which is located between every message, and thereby can eliminate the wasted sections T2-1, T2-3, etc. as shown in (B). In the example of (B), some of the automatic telephone answerer like BSR on the United States market require the pre-recording of the out-going message thirty times alternately as shown in (A) by the user or the factory before the automatic operation. So, every user should bear the above mentioned blanks. It is too heavy for the ordinary users to bear, but such defect was overcomed by the above mentioned method of this invention.

Figure 8:
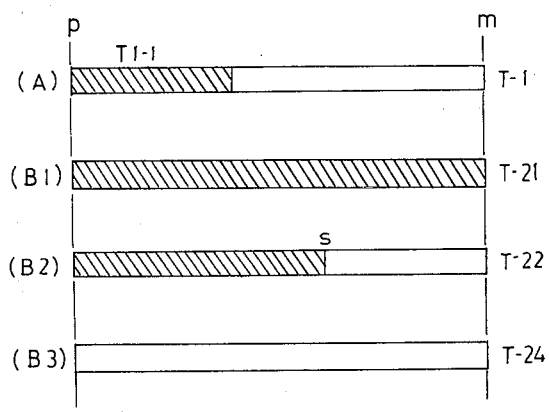
FIG. 8, including A-B$_3$, is the timing chart of FIG. 7.

In FIG. 7, the application of FIG. 5 is shown. In FIG. 7, T-1 is forwarded upon receipt of a telephone call. The T-2 is automatically rewound from the point m of FIG. 8. From the beginning point p, it is played back at the ordinary tape driving speed. At the same time, the track of T-2 which includes T-21, T-22, T-24, etc. becomes the recording mode, and takes messages. When it reaches the point m, it automatically stops, and then it is rewound automatically. Then, it stops at the beginning of the tape, that is the point p, and then T1-1 becomes the stand-by mode. At the next telephone call, T1-1 is driven as above. After reaching the point m, it is automatically rewound. Then, the track of T-22 becomes the recording mode. If the calling party stops talking at the point s, the recording mode is continued until the point m on which the busy-tone or the dial-tone may be recorded. When it reaches the point m, the T-2 is automatically rewound until the beginning of the tape, that is the point p. Then, the automatic telephone answerer becomes the stand-by mode. This application is made by broadening the tape width and shortening the length of the tape which can include plurality of the recording track, but it is also one embodiment of this invention, because there is no need of any arrangement to rewind the tape except disenergizing of the solenoid coil SD.

In FIG. 5, the upper half and the bottom half of the long tape are used as means of both announcing the message and receiving messages respectively, but in FIG. 7, these are changed to a short tape which is equivalent to one cycle of the out-going message and plurality of the track which takes the incoming messages.

To clarify the difference between the prior arts and this invention, the Applicant explains one example as follows. For instance, in the case of the Japanese Patent Application No. S50-133212 (Open-to-public No. S52-57705), T-1 and T-2 are not driven simultaneously. T-2 is driven after T-1 stops. Also, T-2 keeps running so long as the voice of the calling party is continued. The T-2 is to be stopped by a voice-activated switch after pre-determined time, which can be decided by a pause time or a silent time or a dial-tone or a busy-tone, depending on the telephone exchange system. However, the above pause time becomes anyway wasted time for the user who wants to play back T-2 after returning home. So, in this application, T-2 can be automatically rewound in the same length as that of the last wasted pause which has been produced due to the last voice-activated time. One of the results of this invention and the above prior art seems to be almost the same to overcome the wasted portion of T-2, but its means and function are quite different.

CAPABILITY OF EXPLOITATION IN INDUSTRY

This invention simplified the construction of the automatic telephone answerer with remote function and decreases the manufacturing cost and increases the capacity of the incoming message tape by minimizing the wasted blank portions. So, it makes the user use it very economically using a single plunger coil.

I claim:

1. In a telephone answering device comprising; Means responsive to a calling signal for engaging a telephone line, means to transmit an out-going message from an out-going message tape (T-1) to said line, means to record an incoming message from said line on an incoming message tape (T-2), tape driving means for simultaneously driving both said tapes in response to said calling signal responsive means being triggered, means of generating a beep-tone when said out-going message (T-1) is driven to a predetermined point, switching means to switch between FORWARD and REWIND drive for said incoming message tape (T-2), time control means which is energized by the beep-tone generating means and which causes REWIND driving of T-2 for a certain pre-determined time by said switching means, means of generating a particular signal while said time control means is energized, means of sending said particular signal to a calling party through said telephone line, means responsive to said time control means being de-energized to cause said switching means to switch to forward drive in a recording mode and stopping means for both said tapes (T-1 and T-2) triggered by a signal from the out-going message tape (T-1) which releases the engagement of said telephone line and resets the telephone answering device to stand-by.

2. A telephone answering device in accordance with claim 1 characterized by adjustment of said time control means to prevent overlapping of an incoming message with a prior incoming message irrespective of diameter of rewound incoming message tape (T-2).

* * * * *